United States Patent
Inoue et al.

(10) Patent No.: US 8,758,194 B2
(45) Date of Patent: Jun. 24, 2014

(54) POWER TRANSMISSION CONTROL DEVICE FOR VEHICLE

(75) Inventors: Hiroki Inoue, Nishio (JP); Takeshige Miyazaki, Chiryu (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 0 days.

(21) Appl. No.: 13/825,575

(22) PCT Filed: Aug. 9, 2011

(86) PCT No.: PCT/JP2011/068106
§ 371 (c)(1),
(2), (4) Date: Mar. 22, 2013

(87) PCT Pub. No.: WO2012/077380
PCT Pub. Date: Jun. 14, 2012

(65) Prior Publication Data
US 2013/0190133 A1 Jul. 25, 2013

(30) Foreign Application Priority Data

Dec. 8, 2010 (JP) ................................. 2010-273561

(51) Int. Cl.
*B60W 10/02* (2006.01)
*B60W 10/10* (2012.01)
(52) U.S. Cl.
USPC ............................................................. 477/5
(58) Field of Classification Search
USPC ............................................... 477/5, 77, 181
See application file for complete search history.

(56) References Cited

U.S. PATENT DOCUMENTS

| 2009/0156355 A1* | 6/2009 | Oh et al. ........................ 477/5 |
| 2010/0234172 A1* | 9/2010 | Miyazaki et al. ............... 477/5 |
| 2011/0009237 A1* | 1/2011 | Kim et al. ....................... 477/5 |

FOREIGN PATENT DOCUMENTS

| JP | 2010-149560 A1 | 7/2010 |
| JP | 2000-224710 A1 | 8/2010 |
| JP | 2010-254071 A1 | 11/2010 |

OTHER PUBLICATIONS

International Search Report and Written Opinion dated Nov. 8, 2011.

* cited by examiner

*Primary Examiner* — Edwin A Young
(74) *Attorney, Agent, or Firm* — Burr & Brown, PLLC

(57) ABSTRACT

This power transmission control device is applied to a hybrid vehicle, includes a manual transmission, a friction clutch, and a speed-reduction-ratio changeover mechanism. The speed-reduction-ratio changeover mechanism can change the speed reduction ratio of a second shaft connected to an output shaft of the manual transmission in relation to a first shaft connected to an output shaft of the vehicle motor. The speed reduction ratio of drive wheels to the output shaft of the vehicle motor is changed by changing the speed reduction ratio of the second shaft in relation to the first shaft. The operation for changing the speed reduction ratio is performed while a driver is operating a clutch pedal. Namely, while the driver is performing some operation, he or she receives a shock generated as a result of speed-reduction-ratio change operation. Accordingly, the driver becomes less likely to sense such a shock.

5 Claims, 5 Drawing Sheets

POWER TRANSMISSION CONTROL DEVICE FOR VEHICLE

TECHNICAL FIELD

The present invention relates to a power transmission control device for a vehicle, and more particularly to a power transmission control device which is applied to a vehicle having an internal combustion engine and an electric motor as power sources and which includes a manual transmission and a friction clutch.

BACKGROUND ART

Conventionally, there has been widely known a so-called hybrid vehicle which includes an engine and an electric motor (motor generator) as power sources (see, for example, Patent Document 1). In recent years, there has been developed a power transmission control device which is applied to a hybrid vehicle and which includes a manual transmission and a friction clutch (hereinafter referred to as a "power transmission control device for an HV-MT vehicle"). A term "manual transmission" used herein refers to a transmission which does not include a torque converter and whose gear stage is selected in accordance with the shift position of a shift lever operated by a driver (the manual transmission may be abbreviated as MT). Also, a term "friction clutch" used herein refers to a clutch which is interposed between the output shaft of an internal combustion engine and the input shaft of the manual transmission and which is configured such that the engagement state of a friction plate changes in accordance with the operation quantity of a clutch pedal operated by the driver.

PRIOR ART DOCUMENT

Patent Document

Patent Document 1: Japanese Patent Application Laid-Open (kokai) No. 2000-224710

SUMMARY OF THE INVENTION

Incidentally, in a power transmission control device for an HV-MT vehicle, it is preferable to decrease or increase the speed of rotation of the output shaft of the electric motor in relation to the speed of rotation of the drive wheels as necessary for stably providing enough drive torque of the drive wheels based on the drive torque of the electric motor. For this operation, it is conceivable to provide, for the power transmission control device for an HV-MT vehicle, a changeover mechanism which changes the speed reduction ratio of the drive wheels in relation to the output shaft of an electric motor (the ratio of the rotation speed of the output shaft of the electric motor to that of the drive wheels) without changing the gear stage of the manual transmission (separately from the manual transmission).

In the case where such a changeover mechanism is provided, transmission of the torque from the output shaft of the electric motor to the drive wheels must be inevitably interrupted temporarily when the speed reduction ratio is changed. Accordingly, a shock is unavoidably generated as a result of a change in the speed reduction ratio (a change in acceleration of the vehicle in a forward or rearward direction thereof). Generation of such a shock provides unpleasant feel to the driver.

An object of the present invention is to provide a power transmission control device for an HV-MT vehicle which device includes a changeover mechanism for changing the speed reduction ratio of the drive wheels in relation to the output shaft of the electric motor, and which device prevents a driver of the vehicle from perceiving a shock caused by a change in the speed reduction ratio.

The power transmission control device for a vehicle according to the present invention is applied to a hybrid vehicle having an internal combustion engine and an electric motor as power sources. This power transmission device includes a manual transmission, a friction clutch, a changeover mechanism, and control means.

The manual transmission is a transmission which does not include a torque converter and whose gear stage is selected in accordance with the shift position of a shift operation member operated by a driver. The manual transmission has an input shaft which receives power from an output shaft of the internal combustion engine and an output shaft which outputs power to drive wheels of the vehicle. The output shaft of the electric motor is connected to the input shaft of the manual transmission or the output shaft thereof.

The friction clutch is a clutch which is interposed between the output shaft of the internal combustion engine and the input shaft of the manual transmission and which is configured such that the engagement state changes in accordance with the operation quantity of a clutch operation member operated by the driver. Operation of the clutch operation member is detected by first detection means.

The changeover mechanism changes the speed reduction ratio of the drive wheels in relation to the output shaft of the electric motor (the ratio of the rotational speed of the output shaft of the electric motor to that of the drive wheels) without changing the gear stage of the manual transmission. The control means controls the drive torque of the output shaft of the internal combustion engine (internal combustion engine drive torque), the drive torque of the output shaft of the electric motor (electric motor drive torque), and the state of the changeover mechanism.

Specifically, the changeover mechanism may be a mechanism which is interposed in a power transmission system (line) formed between the output shaft of the electric motor and the output shaft of the manual transmission such that it does not include the manual transmission therein, which has a first shaft connected to the output shaft of the electric motor and a second shaft connected to the output shaft of the manual transmission, and which changes the speed reduction ratio of the second shaft in relation to the first shaft. In this case, the control means is configured to change the speed reduction ratio of the drive wheels in relation to the output shaft of the electric motor by causing the changeover mechanism to change the speed reduction ratio of the second shaft in relation to the first shaft.

Alternatively, the changeover mechanism may be a mechanism which is interposed in a first power transmission system (line) formed between the output shaft of the electric motor and the output shaft of the manual transmission such that it does not include the manual transmission therein, which is interposed in a second power transmission system (line) formed between the output shaft of the electric motor and the input shaft of the manual transmission such that it does not include the manual transmission therein, and which selectively realizes a first state in which the first power transmission system is established and the second power transmission system is not established or a second state in which the first power transmission system is not established and the second power transmission system is established. In this case, the control means is configured to change the speed reduction ratio of the drive wheels in relation to the output shaft of the electric motor by causing the changeover mechanism to selectively realize the first state or the second state.

The feature of the power transmission control device according to the present invention resides in that the control means performs a speed-reduction-ratio change operation, which is an operation of changing the speed reduction ratio of the drive wheels in relation to the output shaft of the electric motor by controlling the state of the changeover mechanism, in a period during which the operation of the clutch operation member is being detected.

In the power transmission control device for an HV-MT vehicle, in order to change the gear stage of the manual transmission, the driver must operate the shift operation member while operating the clutch operation member. In general, a human being becomes less likely to sense a shock or the like from the outside, when he or she is performing some operation. The above-mentioned configuration is adopted in view of this fact.

According to the above-described configuration, the speed-reduction-ratio change operation is performed while the driver is operating the clutch operation member. In other words, while operating the clutch operation member, the driver receives a shock generated as a result of the speed-reduction-ratio change operation. Accordingly, the driver becomes less likely to sense such a shock.

Specifically, the speed-reduction-ratio change operation may be started in response to the operation of the clutch operation member. Alternatively, the speed-reduction-ratio change operation may be started in response to the operation of the clutch operation member and the operation of the shift operation member. Preferably, the speed-reduction-ratio change operation is performed during the period from start to end of the operation of the clutch operation member (from the moment the driver starts depressing the clutch pedal CP to the moment the driver releases it completely).

MODE FOR CARRYING OUT THE INVENTION

Figure 1:
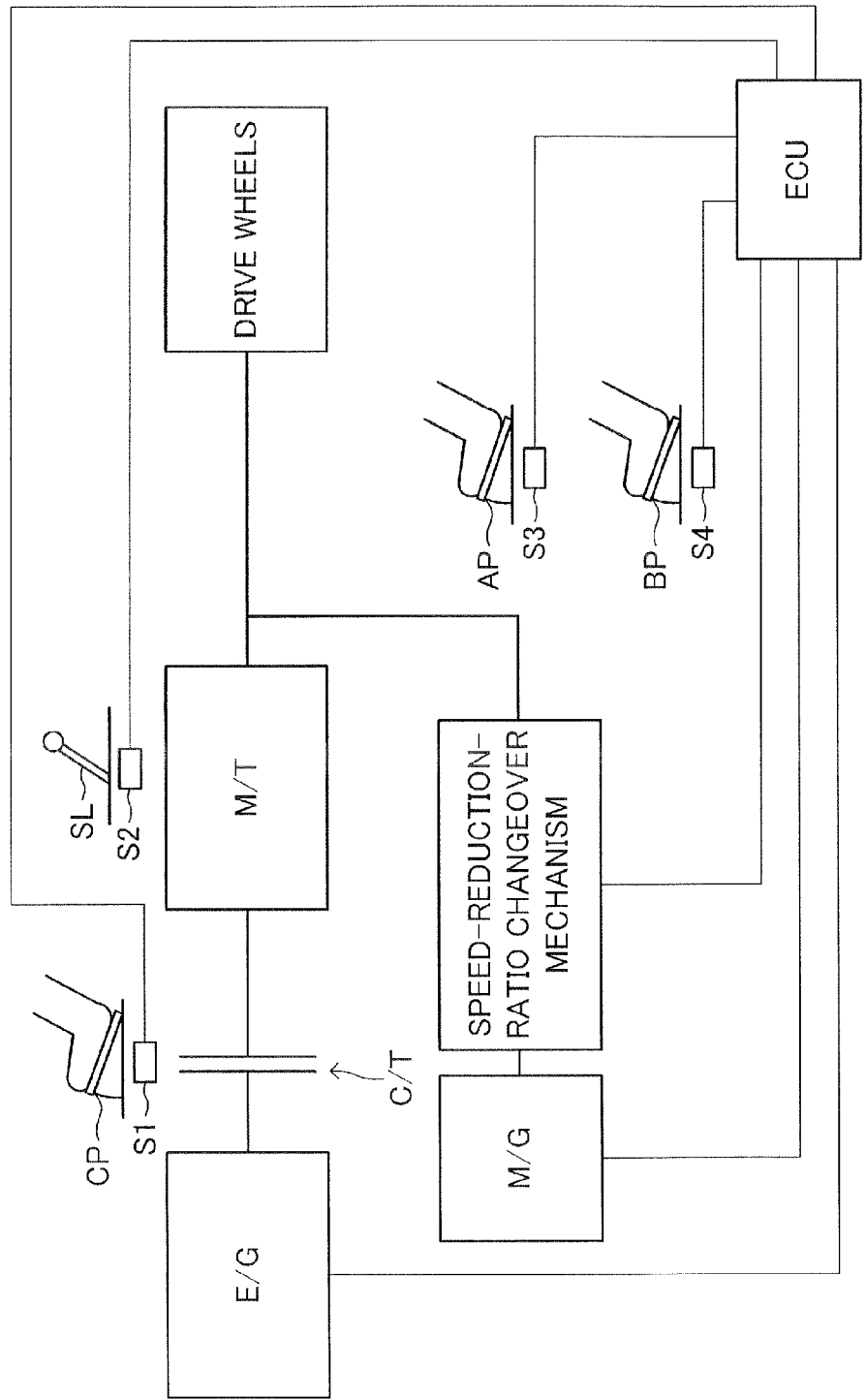
FIG. 1 is a schematic diagram of a vehicle including a "power transmission control device for an HV-MT vehicle" according to an embodiment of the present invention.

A power transmission control device for a vehicle according to an embodiment of the present invention will now be described with reference to the drawings.
(Structure)
FIG. 1 is a diagram schematically showing the configuration of a vehicle including a power transmission control device (hereinafter referred to as "the present device") according to an embodiment of the present invention. This vehicle is a hybrid vehicle which includes an internal combustion engine and a motor generator as power sources. The present device includes a friction clutch and a manual transmission which does not include a torque converter. Namely, the present device is the above-described "power transmission control device for an HV-MT vehicle."

This vehicle includes an engine E/G, a manual transmission M/T, the friction clutch UT, the motor generator M/G, and a speed-reduction-ratio changeover mechanism. The engine E/G is a well-known internal combustion engine, such as a gasoline engine which uses gasoline as fuel, or a diesel engine which uses light oil as fuel.

Figure 2:
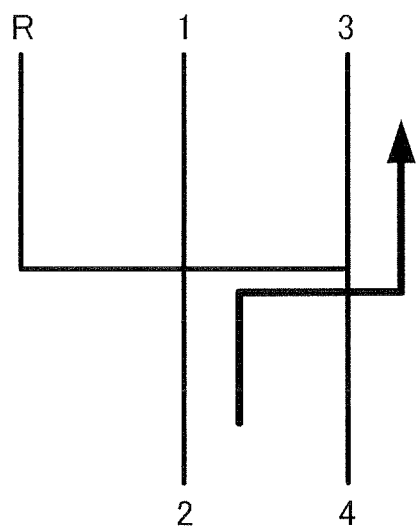
FIG. 2 is a diagram showing an example of a shift pattern of a manual transmission shown in FIG. 1.

The manual transmission M/T is a transmission (a so-called manual transmission) which does not include a torque converter and whose gear stage is selected in accordance with the shift position of a shift lever SL operated by a driver. The manual transmission M/T has an input shaft which receives power from an output shaft of the engine E/G and an output shaft which outputs power to drive wheels of the vehicle. As can be understood from the shift pattern shown in FIG. 2, the manual transmission M/T has, for example, four forward gear stages (1-st to 4-th) and a single reverse gear stage (R) as selectable gear stages.

The gear stage of the manual transmission M/T may be mechanically selected (changed) in accordance with the shift position of the shift lever SL, by making use of a link mechanism or the like which mechanically connects the shift lever SL to a sleeve (not shown) in the manual transmission M/T. Alternately, the gear stage of the manual transmission M/T may be electrically selected (changed) (by a so-called by-wire scheme) by making use of drive force of an actuator which operates on the basis of the result of detection by a sensor for detecting the shift position of the shift lever SL (a sensor S2 which will be described later).

The friction clutch C/T is disposed between the output shaft of the engine E/G and the input shaft of the manual transmission M/T. The friction clutch C/T is a well-known clutch configured such that the engagement state of a friction plate (more specifically, the axial position of the friction plate, which rotates together with the input shaft of the manual transmission M/T, in relation to a flywheel, which rotates together with the output shaft of the engine E/G) changes depending upon an operation quantity (depression amount) of a clutch pedal CP operated by the driver.

The engagement state of the friction clutch C/T (the axial position of the friction plate) may be mechanically adjusted in accordance with the operation quantity of the clutch pedal CP, by making use of a link mechanism or the like which mechanically connects the clutch pedal CP to the friction clutch C/T (the friction plate). Alternately, the engagement state of the friction clutch C/T may be electrically adjusted (by a so-called by-wire scheme) by making use of the drive force of an actuator which operates on the basis of the result of detection by a sensor for detecting the operation quantity of the clutch pedal CP (a sensor S1 which will be described later).

The motor generator M/G has a well-known structure (e.g., an AC synchronous motor), and its rotor (not shown) rotates together with the output shaft thereof. The output shaft of the motor generator M/G is connected to the output shaft of the manual transmission M/T via the speed-reduction-ratio changeover mechanism in a power transmissible manner. In the following description, drive torque from the output shaft of the engine E/G will be referred to as "EG torque," and drive torque from the output shaft of the motor generator M/G as "MG torque."

The speed-reduction-ratio changeover mechanism has a first shaft which is connected to the output shaft of the motor generator M/G and a second shaft which is connected to the output shaft of the manual transmission M/T. The speed-reduction-ratio changeover mechanism can change the speed reduction ratio of the second axis in relation to the first axis (the ratio of rotational speed of the first shaft to that of the second shaft). The speed reduction ratio of the drive wheels in relation to the output shaft of the motor generator M/G is changed by changing the speed reduction ratio of the second shaft in relation to the first axis. The speed reduction ratio of the second shaft in relation to the first shaft can be selectively set to one of a plurality of ratios. The speed reduction ratio is changed by making use of the drive force of an actuator. Since the speed-reduction-ratio changeover mechanism has a well-known structure, its detailed description will not be provided.

The present device includes a clutch operation quantity sensor S1 which detects the operation quantity (depression amount, clutch stroke, etc.) of the clutch pedal CP, a shift position sensor S2 which detects the position of the shift lever SL, an accelerator operation quantity sensor S3 which detects the operation quantity (accelerator opening) of an accelerator pedal AP, and a brake operation quantity sensor S4 which detects the operation quantity (depression force, presence/absence of operation, etc.) of a brake pedal BP.

Moreover, the present device includes an electronic control unit (hereinafter simply referred to as the "ECU"). On the basis of information from the above-mentioned sensors S1 to S4 and other sensors, etc., the ECU controls the fuel injection amount of the engine E/G (the opening of its throttle valve) to thereby control the EG torque, and controls an inverter (not shown) to thereby control the MG torque. In addition, the ECU selectively sets the speed reduction ratio of the second shaft in relation to the first shaft to one of the plurality of ratios by controlling an actuator of the speed-reduction-ratio changeover mechanism. Hereinafter, an operation of changing the speed reduction ratio of the speed-reduction-ratio changeover mechanism will be referred to as an "MG connection changeover operation." During the MG connection changeover operation, the MG torque is maintained at zero.

(Timing of MG Connection Changeover Operation)

As described above, during the MG connection changeover operation, transmission of the torque from the output shaft of the motor generator M/G to the drive wheels may be interrupted temporarily. Accordingly, a shock (a change in acceleration of the vehicle in a forward or backward direction thereof) due to the MG connection changeover operation is unavoidably generated. Generation of such a shock provides unpleasant feel to the driver.

In the power transmission control device for an HV-MT vehicle such as the present device, in order to change the gear stage of the manual transmission M/T, the driver is required to operate the shift lever SL while operating the clutch pedal CP. In general, a human being becomes less likely to sense a shock or the like from the outside, when he or she is performing some operation.

In view of this, in the present device, the MG connection changeover operation is performed while the driver is performing the operation for changing the gear stage of the manual transmission M/T. Specifically, the MG connection changeover operation is performed while the clutch pedal CP is being operated (from the moment the driver starts depressing the clutch pedal CP to the moment the driver releases it completely). Hereinafter, there will be described an example case where the speed-reduction-ratio changeover mechanism can set the speed reduction ratio of the second shaft in relation to the first shaft to one of two values; i.e., "Low" (the speed reduction ratio is large) and "High" (the speed reduction ratio is small).

Figure 3:
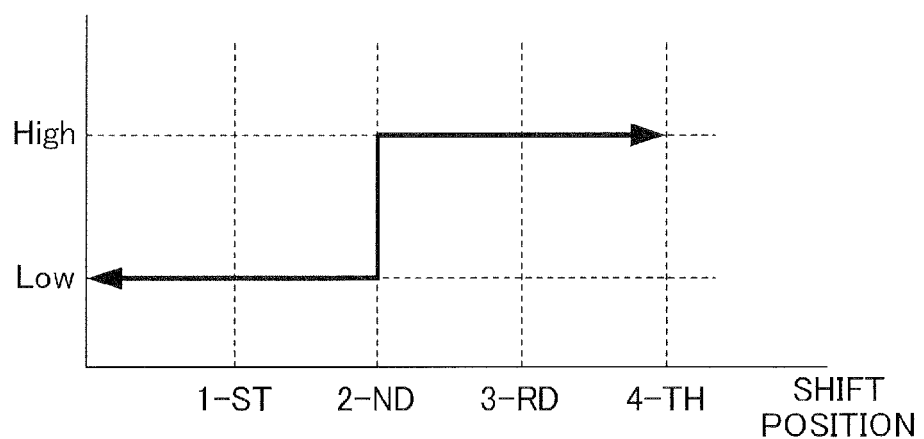
FIG. 3 is a diagram showing an example of the relation between timings of speed reduction ratio change by a changeover mechanism and timings of shift position change.
Figure 4:
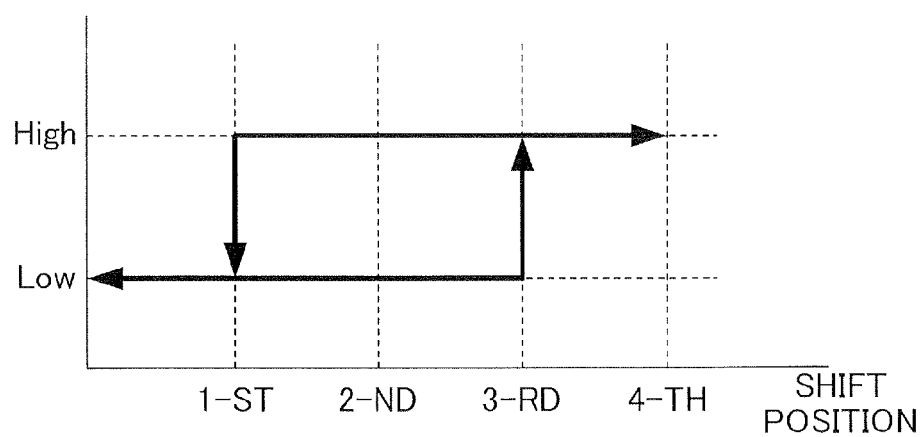
FIG. 4 is a diagram showing another example of the relation between timings of speed reduction ratio change by the changeover mechanism and timings of shift position change.

For example, as shown in FIG. 3, the speed reduction ratio may be changed from "Low" to "High" when the transmission is upshifted from "1-st" to "2-nd" (or "3-rd" or "4-th"), and the speed reduction ratio may be changed from "High" to "Low" when the transmission is downshifted from "3-rd" (or "4-th") to "2-nd" (or "1-st"). Alternatively, as shown in FIG. 4, the speed reduction ratio may be changed from "Low" to "High" when the transmission is upshifted from "2-nd" (or "1-st") to "3-rd" (or "4-th"), and the speed reduction ratio may be changed from "High" to "Low" when the transmission is downshifted from "2-nd" (or "3-rd" or "4-th") to "1-st". Employment of the pattern shown in FIG. 4 decreases the number of times the speed reduction ratio is changed, as compared with the case where the pattern shown in FIG. 3 is employed, to thereby reduce the power necessary for driving the actuator of the speed-reduction-ratio changeover mechanism.

As shown in FIGS. 3 and 4, when the shift position is on a low speed side (a high speed side), "Low" ("High") is selected for the following reason. When the shift position is on the low speed side, the vehicle speed is low (the rotational speed of the drive wheels is low). Accordingly, the rotational speed of the output shaft of the motor generator M/G must be increased. When the shift position is on the high speed side, the vehicle speed is high (the rotational speed of the drive wheels is high). Accordingly, the rotational speed of the output shaft of the motor generator M/G must be decreased.

Figure 5:
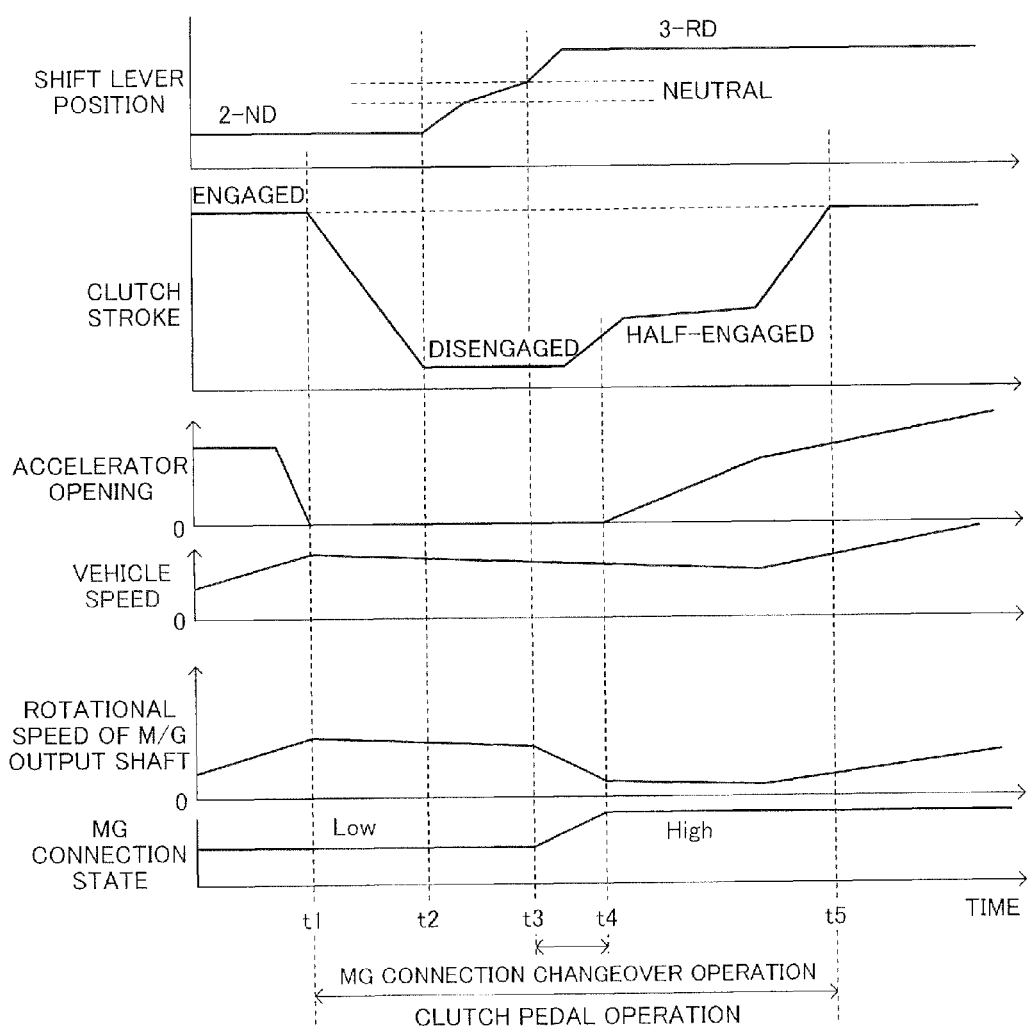
FIG. 5 is a timing chart showing an example case where the speed reduction ratio of the changeover mechanism is changed by the device shown in FIG. 1 during clutch pedal operation.

FIG. 5 shows an example case where the present device performs the MG connection changeover operation during the operation of the clutch pedal CP. In this example, the speed reduction ratio of the speed-reduction-ratio changeover mechanism is changed from "Low" to "High" when the shift position is changed for upshift from "2-nd" to "3-rd" (see the arrow in FIG. 2).

Specifically, the operation of the clutch pedal CP starts (the depressing operation starts) at time t1, the depression amount of the clutch pedal CP increases after time t1, and the friction clutch C/T is brought to a completely disengaged state at time t2. Around time t2, operation of the shift lever SL for upshift from "2-nd" to "3-rd" is started (executed). After completion of the operation of the shift lever SL for upshift from "2-nd" to "3-rd," the depression amount of the clutch pedal CP decreases so as to adjust the friction clutch C/T such that it is placed in a half engaged state. After this, the depression amount of the clutch CP decreases further. At time t5, the operation of the clutch pedal CP ends (the releasing operation ends).

In this example, during the period from time t3 and time t4 (notably, this period is between time t1 and time t5), the MG connection changeover operation (i.e., "the operation for changing the speed reduction ratio of the speed-reduction-ratio changeover mechanism from "Low" to "High") is performed. Notably, at least during the period from time t3 to time t4, the MG torque is maintained at zero. Before time t3 and after time t4, the MG torque may be adjusted to a value which is greater than zero.

In this example, time t3 corresponds to a point in time at which the gear stage of the manual transmission M/T starts changing from "neutral" to "3-rd" (specifically, a point in time at which there starts spline engagement between a sleeve in the manual transmission M/T and a teeth for fixing the 3-rd gear). Namely, it can be said that time t3 is a point in time at which the next shift position becomes certain during the shift operation via the neutral shift position (in this example, a point in time at which the upshift from "2-nd" to "3-rd" becomes certain).

Since whether the current shift operation is a shift-down operation or a shift-up operation is not known until the next shift position becomes certain, it is unknown whether or not the MG connection changeover operation is to be performed in synchronism with the current shift operation. In contrast, in this example, since the MG connection changeover operation is started only when the next shift position becomes certain (the condition for starting the MG connection changeover operation), the MG connection changeover operation is never performed at a timing other than the timing at which the MG connection changeover operation is to be performed.

As described above, in this example, "(the clutch pedal CP being operated and) the next shift position having became certain" is employed as the condition for starting the MG connection changeover operation. However, the MG connection changeover operation may be started before the next shift position becomes certain. In this case, "(the clutch pedal CP being operated and) movement of the shift lever SL having been stated" (immediately after time t2 in FIG. 5) and "(the clutch pedal CP being operated and) the depression amount of the clutch pedal CP having exceeded a predetermined value" (any point in time between times t1 and time t2 in FIG. 5) may be employed as the conditions for starting the MG connection changeover operation. Alternatively, "(the clutch pedal CP being operated and) the slope of the change in the rotational speed of the input shaft of the manual transmission M/T having exceeded a predetermined value" may be employed as the condition for starting the MG connection changeover operation.

In the case where the MG connection changeover operation is started before the next shift position becomes certain, there arises the necessity of estimating the next shift position (namely, the necessity of estimating whether the current shift operation is a shift-down operation or a shift-up operation). This estimation can be done on the basis of, for example, the vehicle speed, acceleration of the vehicle in a forward or rearward direction thereof, the operation state of the brake pedal BP, the operation state of the accelerator pedal AP, etc.

As the timing to start the MG connection changeover operation, only one of the above-described timings may be used. Alternatively, among the above-described timings, the timing used as the timing to start the MG connection changeover operation may be selected and changed in accordance with the traveling state of the vehicle. Alternatively, of the above-described timings, a different timing may be selected as the timing to start the MG connection changeover operation, depending on whether the speed reduction ratio of the speed-reduction-ratio changeover mechanism is "Low" or "High."

(Action and Effects)

As described above, in the present device, the MG connection changeover operation is performed while the driver is performing the operation for changing the gear stage of the manual transmission M/T. Specifically, the MG connection changeover operation is performed while the clutch pedal CP is being operated (from the moment the driver starts depressing the clutch pedal CP to the moment the driver releases it completely). Namely, while the driver is operating the clutch pedal CP, he or she receives a shock generated as a result of the MG connection changeover operation. Accordingly, the driver becomes less likely to sense such a shock.

The present invention is not limited to the above-described embodiment, and various modifications may be adopted without departing from the scope of the present invention. For example, in the above-described embodiment, the speed-reduction-ratio changeover mechanism for changing the speed reduction ratio of the second shaft in relation to the first shaft is employed as a "changeover mechanism." Alternatively, as shown in FIG. 6, a connection changeover mechanism may be employed as the "changeover mechanism."

Figure 6:
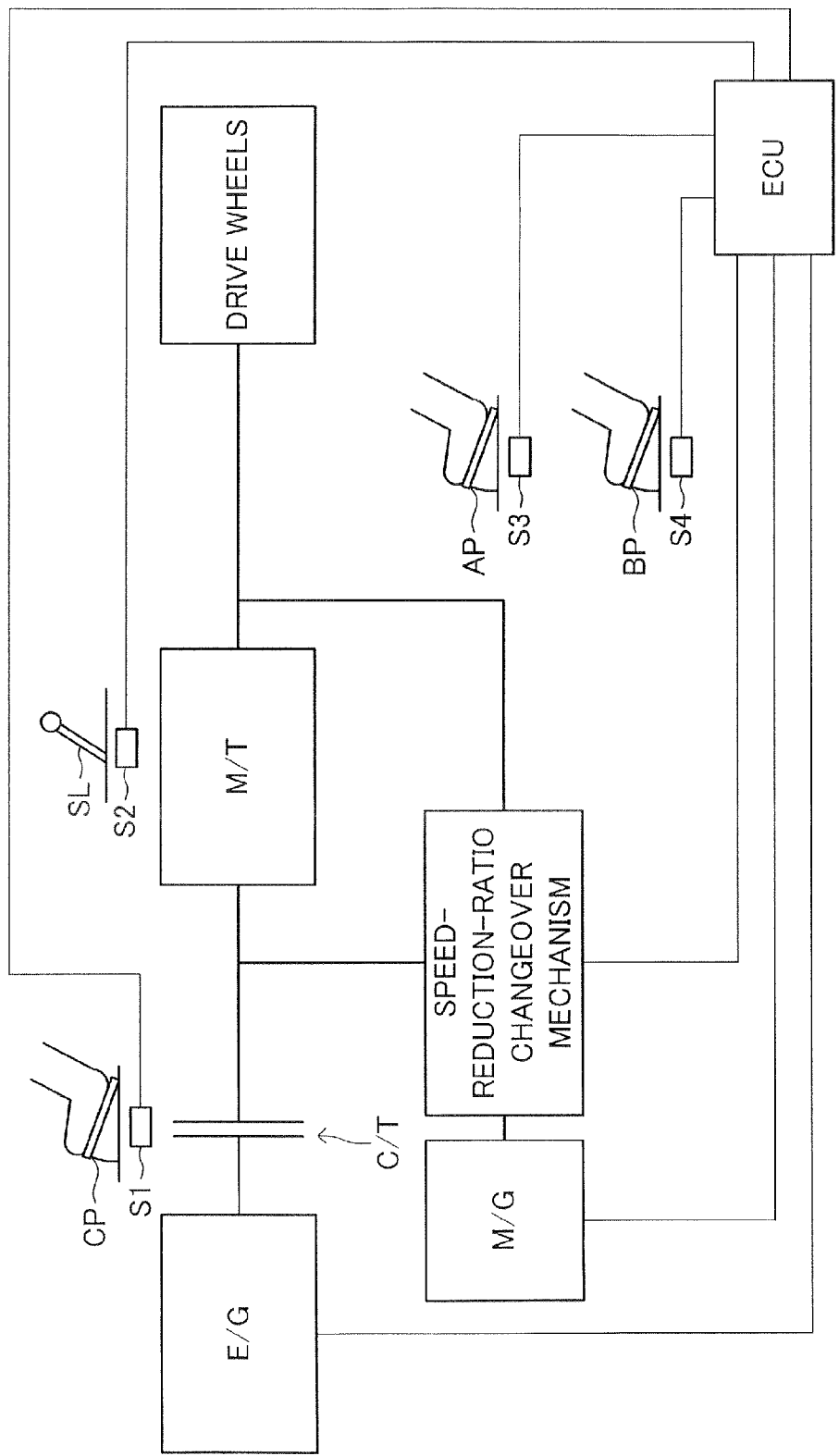
FIG. 6 is a schematic diagram of a vehicle including a "power transmission control device for an HV-MT vehicle" of a modification of the embodiment of the present invention.

The connection changeover mechanism shown in FIG. 6 is interposed in a first power transmission system (line) which is formed between the output shaft of the motor generator M/G and the output shaft of the manual transmission M/T. Also, the connection changeover mechanism is interposed in a second power transmission system (line) which is formed between the output shaft of the motor generator M/G and the input shaft of the manual transmission M/T. The connection changeover mechanism shown in FIG. 6 selectively realizes an OUT connection state in which the first power transmission system is established and the second power transmission system is not established or an IN connection state in which the first power transmission system is not established and the second power transmission system is established. The speed reduction ratio of the drive wheels in relation to the output shaft of the motor generator M/G is changed by selectively establishing the OUT connection state or the IN connection state. Switching between the OUT connection state and the IN connection state is caused by making use of the drive force of the actuator. Since the connection changeover mechanism shown in FIG. 6 has a well-known structure, its detailed description will not be provided.

In the case where the connection changeover mechanism shown in FIG. 6 is employed, as in the case where the speed-reduction-ratio changeover mechanism is employed, the transmission of the torque from the output shaft of the motor generator M/G to the drive wheels must be inevitably interrupted temporarily when switching between the OUT connection state and the IN connection state takes place. As a result, a shock (a change in acceleration of the vehicle in a forward or backward direction thereof) is unavoidably generated. Since the switching between the OUT connection state and the IN connection state takes place while the driver is operating the clutch pedal CP, he or she becomes less likely to sense such a shock.

Moreover, in the above-described embodiment, only the "gear stages in which a power transmission system is established between the input and output shafts of the manual transmission M/T" for ordinary travel utilizing the EG torque (assistance by the MG torque is possible), are employed as the gear stages (1-st to 4-th) of the manual transmission M/T (hereinafter these gear stages will be referred to as "EG travel gear stages"). In addition to the EG travel gear stages, there may be provided a "gear stage in which a power transmission system is not established between the input shaft of the manual transmission M/T and the output shaft of the manual transmission M/T and a power transmission system is established between the output shaft of the motor generator M/G and the output shaft of the manual transmission M/T" for EV travel (a gear stage other than the neutral; hereinafter referred to as the "MG travel gear stage"). The term "EV travel" refers to a state in which the vehicle travels utilizing only the MG torque while maintaining the engine E/G in a stopped state (a state in which rotation of the output shaft of the engine E/G is stopped).

In the case where the connection changeover mechanism shown in FIG. 6 is employed and an "MG travel gear stage" (e.g., 1-st) for starting the vehicle is provided, the OUT connection state is selected when the "MG travel gear stage"

(e.g., 1-st) is selected, and the IN connection state is selected when an "EG travel gear stage" (e.g., one of 2-nd to 4-th) is selected.

DESCRIPTION OF SYMBOLS

M/T: manual transmission
E/G: engine
C/T: clutch
M/G: motor generator
CP: clutch pedal
AP: accelerator pedal
S1: clutch operation quantity sensor
S2: shift position sensor
S3: accelerator operation quantity sensor
ECU: electronic control unit

The invention claimed is:

1. A power transmission control device for a vehicle which includes an internal combustion engine and an electric motor as power sources, comprising:
   a manual transmission which has an input shaft for receiving power from an output shaft of the internal combustion engine and an output shaft for outputting power to drive wheels of the vehicle, which does not include a torque converter, and whose gear stage is selected in accordance with a shift position of a shift operation member operated by a driver, an output shaft of the electric motor being connected to the input shaft or output shaft of the manual transmission;
   a friction clutch which is interposed between the output shaft of the internal combustion engine and the input shaft of the manual transmission and whose engagement state changes in accordance with an operation quantity of a clutch operation member operated by the driver;
   a changeover mechanism which changes a speed reduction ratio of the drive wheels in relation to the output shaft of the electric motor without changing the gear stage of the manual transmission; and
   control means which controls internal combustion engine drive torque which is drive torque of the output shaft of the internal combustion engine, electric motor drive torque which is drive torque of the output shaft of the electric motor, and the state of the changeover mechanism, wherein
   the power transmission control device further comprises first detection means for detecting operation of the clutch operation member; and
   the control means performs a speed-reduction-ratio change operation, which is an operation of changing the speed reduction ratio of the drive wheels in relation to the output shaft of the electric motor by controlling the state of the changeover mechanism, in a period during which the operation of the clutch operation member is being detected.

2. A power transmission control device for a vehicle according to claim 1, wherein the control means starts the speed-reduction-ratio change operation in response to the operation of the clutch operation member.

3. A power transmission control device for a vehicle according to claim 2, further comprising second detection means for detecting operation of the shift operation member, wherein the control means starts the speed-reduction-ratio change operation in response to the operation of the clutch operation member and the operation of the shift operation member.

4. A power transmission control device for a vehicle according to claim 1, wherein the changeover mechanism is interposed in a power transmission system which is formed between the output shaft of the electric motor and the output shaft of the manual transmission and does not include the manual transmission therein, has a first shaft connected to the output shaft of the electric motor and a second shaft connected to the output shaft of the manual transmission, and changes a speed reduction ratio of the second shaft in relation to the first shaft; and
   the control means performs the speed-reduction-ratio change operation by causing the changeover mechanism to change the speed reduction ratio of the second shaft in relation to the first shaft.

5. A power transmission control device for a vehicle according to claim 1, wherein the changeover mechanism is interposed in a first power transmission system which is formed between the output shaft of the electric motor and the output shaft of the manual transmission and does not include the manual transmission therein and in a second power transmission system which is formed between the output shaft of the electric motor and the input shaft of the manual transmission and does not include the manual transmission therein, and selectively realizes a first state in which the first power transmission system is established and the second power transmission system is not established or a second state in which the first power transmission system is not established and the second power transmission system is established; and
   the control means performs the speed-reduction-ratio change operation by causing the changeover mechanism to selectively realize the first state or the second state.

* * * * *